United States Patent
Abernathy et al.

(10) Patent No.: US 11,435,539 B2
(45) Date of Patent: Sep. 6, 2022

(54) FIBER OPTIC CABLE FOR DISTRIBUTED SENSING WITH RODENT RESISTANT COMPONENTS FROM HARDENED MATERIALS

(71) Applicant: CORNING RESEARCH & DEVELOPMENT CORPORATION, Corning, NY (US)

(72) Inventors: George Cornelius Abernathy, Hildebran, NC (US); Michael John Gimblet, Conover, NC (US); Corey Scott Keisler, Conover, NC (US); Jason Clay Lail, Conover, NC (US); James Arthur Register, III, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/880,210

(22) Filed: May 21, 2020

(65) Prior Publication Data

US 2020/0285010 A1  Sep. 10, 2020

Related U.S. Application Data

(63) Continuation of application No. PCT/US2018/060750, filed on Nov. 13, 2018.
(Continued)

(51) Int. Cl.
*G02B 6/44* (2006.01)
*G01L 1/24* (2006.01)

(52) U.S. Cl.
CPC ............ *G02B 6/4432* (2013.01); *G01L 1/242* (2013.01); *G02B 6/4434* (2013.01); *G02B 6/4495* (2013.01)

(58) Field of Classification Search
CPC .................................................. G02B 6/4433
See application file for complete search history.

(56) References Cited

U.S. PATENT DOCUMENTS 4,505,541 A    3/1985  Considine et al.
4,730,894 A *  3/1988  Arroyo ................ G02B 6/4411
                                                    385/111
(Continued)

FOREIGN PATENT DOCUMENTS

EP    1591816 A1 * 11/2005  ............. H01B 7/328
WO   9959166 A2    11/1999
(Continued)

OTHER PUBLICATIONS

Freeland et al; "Relative Acoustic Sensitivity of Standard Telecom and Specialty Optical Fiber Cables for Distributed Sensing"; Proc. SPIE 10208, Fiber Optic Sensors and Applications XIV, 102080M (Apr. 27, 2017.
(Continued)

*Primary Examiner* — Charlie Y Peng
(74) *Attorney, Agent, or Firm* — William D. Doyle (57) ABSTRACT

A sensing cable for protection against rodent damage includes an optical component comprising at least one optical fiber, a plurality of armor components embedded in the jacket, and a strength member embedded in the cable jacket, wherein when viewed in cross-section, each component of the plurality of armor components and the strength member surround the optical component with a gap formed between each component of the plurality of armor components and the optical transmission component and the strength member.

23 Claims, 4 Drawing Sheets

Related U.S. Application Data (60) Provisional application No. 62/592,835, filed on Nov. 30, 2017.

(56) References Cited

U.S. PATENT DOCUMENTS

| | | | |
|---|---|---|---|
| 4,874,219 A | 10/1989 | Arroyo et al. | |
| 5,016,973 A | 5/1991 | Hager et al. | |
| 5,230,033 A | 7/1993 | Soodak | |
| 6,233,384 B1 | 5/2001 | Sowell et al. | |
| 6,430,344 B1 * | 8/2002 | Dixon | G02B 6/443 385/113 |
| 7,397,992 B1 * | 7/2008 | Blazer | G02B 6/4433 385/106 |
| 7,415,181 B2 * | 8/2008 | Greenwood | G02B 6/4494 385/103 |
| 7,536,073 B2 * | 5/2009 | Seddon | G02B 6/4494 385/100 |
| 7,567,741 B2 | 7/2009 | Abernathy et al. | |
| 7,705,241 B2 | 4/2010 | Steward, Jr. et al. | |
| 7,885,501 B2 | 2/2011 | Patlakh | |
| 8,909,011 B2 | 12/2014 | Abernathy et al. | |
| 10,533,907 B2 | 1/2020 | Logan et al. | |
| 2013/0094821 A1 * | 4/2013 | Logan | G02B 6/4495 385/100 |
| 2013/0108226 A1 | 5/2013 | Gimblet et al. | |
| 2013/0139436 A1 | 6/2013 | Pripps | |
| 2014/0331779 A1 * | 11/2014 | Hurley | G01M 5/0091 73/800 |
| 2015/0104136 A1 | 4/2015 | Peterson, III et al. | |
| 2015/0110451 A1 | 4/2015 | Blazer et al. | |
| 2017/0260847 A1 * | 9/2017 | Xia | G01V 1/226 |

FOREIGN PATENT DOCUMENTS

| | | | | |
|---|---|---|---|---|
| WO | WO-2011014452 A2 * | 2/2011 | | G02B 6/4433 |
| WO | 2017/087133 A1 | 5/2017 | | |

OTHER PUBLICATIONS

International Search Report and Written Opinion of the International Searching Authority; PCT/US2018/060750; dated Jan. 24, 2019; 10 Pages; ISA/US Commissioner for Patents.

* cited by examiner

FIBER OPTIC CABLE FOR DISTRIBUTED SENSING WITH RODENT RESISTANT COMPONENTS FROM HARDENED MATERIALS

PRIORITY APPLICATION

This application is a continuation of International Application No. PCT/US2018/060750, filed Nov. 13, 2018, which claims the benefit of U.S. Provisional Application No. 62/592,835, filed on Nov. 30, 2017, the content of which is relied upon and incorporated herein by reference in its entirety.

BACKGROUND

Fiber optic cables for distributed sensing applications are disclosed that include at least one optical component and elements for rodent damage protection.

Sensing system integrators typically rely on two technologies, Coherent Optical Time Domain Reflectometer (C-OTDR) or Brillouin Optical Time Domain Analysis (B-OTDA) as part of their sensing systems. C-OTDR in conjunction with fiber optic cables is conventionally used in Distributed Acoustic Sensing (DAS) systems. C-OTDR systems detect changes in acoustic waves from changes in geophysical loading near and around a routed fiber optic cable, either buried in the ground or applied onto structures. The change in acoustic waves is detected by the optical fiber in the form of dynamic strain that creates Rayleigh optical scattering. The system converts the strain signal to an optical signal to detect, locate and classify the physical event in real time. Distributed Strain Sensing (DSS), Distributed Vibration Sensing (DVS) and/or Distributed Thermal Sensing (DTS) systems typically employ B-OTDA technology that uses Brillioun optical scattering to detect strain events.

Fiber Optic DAS and DSS systems have widespread use for asset and security monitoring. The acoustic signal from such sources as intruders, vehicles, or gunfire must be coupled from the earth to an optical fiber which is then interrogated by DAS system technology. Because the optical fiber is the sensing element, and because the cable is required to mediate the interaction of the fiber and its environment, the selection of the optical fiber and cable design are critical to the performance of the system. System down-time caused by external tampering or rodents is a concern of system integrators. Conventional telecom cables in the market that meet the rodent resistant criteria lack desired sensitivity, and cables that meet the desired sensitivity do not meet the rodent requirements. There is a need for an optical fiber sensing cable that provides the rodent resistance desired while maintaining the desired sensitivity.

SUMMARY

In accordance with aspects of the disclosure, a sensing cable for protection against rodent damage may include an optical component comprising at least one optical fiber, a plurality of armor components embedded in the jacket, and a strength member embedded in the cable jacket, wherein when viewed in cross-section, each component of the plurality of armor components and the strength member surround the optical component with a gap formed between each component of the plurality of armor components and the optical transmission component and the strength member.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Fiber Optic DAS and DSS systems have widespread use for asset and security monitoring. The acoustic signal from such sources as intruders, vehicles, or gunfire must be coupled from the earth to an optical fiber which is then interrogated by DAS system technology. Because the optical fiber is the sensing element, and because the cable is required to mediate the interaction of the fiber and its environment, the selection of the optical fiber and cable design are critical to the performance of the system. System down-time caused by external tampering or rodents is a concern of system integrators. Conventional telecom cables in the market that meet the rodent resistant criteria lack desired sensitivity, and cables that meet the desired sensitivity do not meet the rodent requirements.

In specific embodiments, the optical fiber cables discussed herein are configured to detect vibration applied to the cable body. Vibration experienced by optical fibers within a cable cause scattering of optical signals within the optical fiber which can be detected/monitored such that the optical cable can function as a vibration sensor/detector. Such vibration sensors may be useful in variety of applications including perimeter monitoring applications, pipeline monitoring applications, etc.

For example, in a perimeter-monitoring application, the vibration sensing optical fiber cable is buried in the ground. Vibration within the ground (e.g., from a vehicle, person, etc. moving near or over the perimeter) is transmitted into the cable causing change in the scattering of the optical signal within the optical fibers of the cable. Detection electronics are connected to the cable to detect/monitor the scattering of the optical signal and to provide an indication/alarm when vibration indicative of perimeter breach are detected. The optical cable embodiments discussed herein can be utilized in other vibration monitoring applications, including pipeline line leak/breakage monitoring. In various embodiments, the sensing systems discussed herein may utilize a variety of sensing modalities, including monitoring/sensing changes in Rayleigh, Raman and/or Brillioun scattering. In some embodiments, the optical cable embodiments discussed herein are used in DAS systems or distributed strain sensing (DSS) systems, and in other embodiments, the optical cable embodiments discussed herein used in distributed temperature sensing systems. In some embodiments, the optical cable embodiments discussed herein combine vibration monitoring applications (e.g., DAS or DSS applications) and temperature monitoring applications (e.g., DTS applications). As will generally be understood DTS applications utilize measurement of Raman scattering for temperature detection.

In specific embodiments, the optical fiber cable embodiments discussed herein are configured to improve/facilitate vibration transmission from the environment and to the sensing optical fibers of the cable while providing added rodent protection versus conventional sensing cables. Cables discussed herein are designed to position the sensing optical fibers within the cable jacket and relative to other cable components (e.g., strength members, armor layers, etc.) in a manner that increases vibration transmission to the sensing optical fibers.

Figure 1:
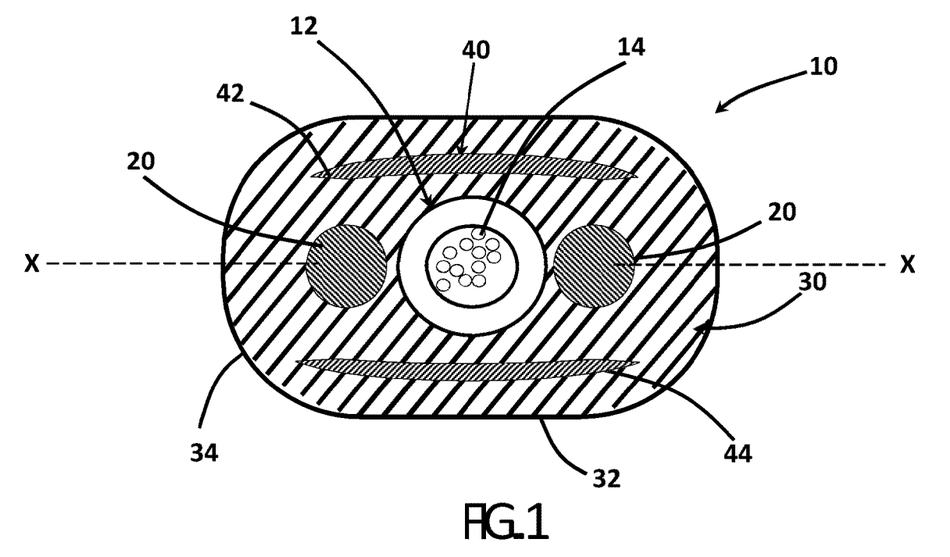
FIG. 1 is a perspective view of a section of an optical fiber cable in accordance with aspects of the present disclosure.
Figure 2:
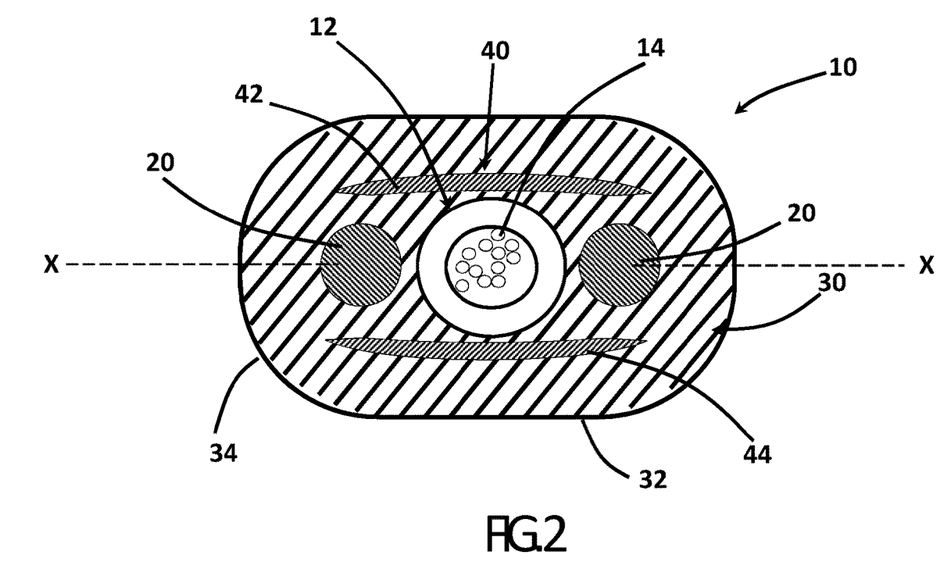
FIG. 2 is a cross-sectional view of a section of the first optical fiber cable with the armor component moved closer to the preferential bend axis of the cable, in accordance with aspects of the present disclosure.

FIGS. 1 and 2 illustrate a fiber optic cable 10 comprising at least one optical transmission component, for example, a buffer tube 12 having at least one, but preferably a plurality of, optical fibers 14. The optical fibers are preferably silica-based, single mode fibers, but they can be any type of optical fiber including, for example, a multi-mode or dispersion shifted optical fibers. Cable 10 includes at least one strain sensing or vibration sensing optical fiber. Buffer tube 12 may be formed of polypropylene and blends thereof, but it can be formed of, for example, polyethylene and blends thereof. Buffer tube 12 may include at least one waterblocking substance, for example, a gel, grease, and/or a superabsorbent material.

As shown in FIG. 1, the buffer tube 12 may be disposed between at least two strength components 20. Preferably, the strength components 20 are solid, rod-like members. By way of example, strength members 20 may be dielectric members such as glass-reinforced plastic (GRPs) having an oval, rectangular, or other shape and/or may be formed from steel or another suitable hard metal. If strength members 20 are formed from steel, then the fiber optic cable is no longer a dielectric design, but the cable may be able to be wrapped around structures for tie-down since the steel or metal strength members have a shape memory. In accordance with certain aspects of the present disclosure, the strength members 20 may be suitably bonded with cable jacket 30. To promote bonding with cable jacket 30, strength members 20 may include one or more adhesion promoters thereon such as selected from the ethylene-acrylic family such as an ethylene-acrylic acid (EAA), but other suitable bonding materials or mechanisms may be used. For instance, bonding can be mechanical bonding by using a strength component with a rough surface or the like.

As shown in FIG. 1, fiber optic cable 10 is generally of a flat configuration. Jacket 30 of fiber optic cable 10 comprises generally arcuate sections 34 and generally flat-sided sections 32. When cable 10 is located within the desired environment (e.g., within ground), an outer surface of the cable 10 engages or interfaces with the environment carrying the vibrations to be detected/monitored using cable 10. The material of jacket 30 may be any material used in cable manufacturing, such as polyethylene, polyvinyl chloride (PVC), polyvinylidene difluoride (PVDF), nylon, polyester or polycarbonate and their copolymers, polyurethane and specifically thermoplastic polyurethane. In a specific embodiment, the material of cable jacket 30 may be a material that has an acoustic impedance selected that is similar/the same as the acoustic impedance the environment. For example, in one embodiment where the vibration-carrying environment is the ground, jacket 30 may be formed from a material, such as medium density polyethylene, having an acoustic impedance less than 2 MRayl, specifically between 1 and 2 MRayl, and even more specifically between 1.5 and 2 MRayl. In some other embodiments, jacket 30 is formed from a TPU material having an acoustic impedance of between 0.8 and 1 MRayl and specifically of 0.85 to 0.95 MRayl.

The strength components 20 are located generally adjacent to the buffer tube 12 with the respective centers of strength components 20 and buffer tube 12 being generally aligned in a preferential bend axis X-X. FIG. 1 is a cross-sectional view of a fiber optic cable 10 having a buffer tube 12 surrounding a plurality of optical fibers 14, a first and a second strength component 20, and a cable jacket 30. As depicted, cable jacket 30 contacts the optical buffer tube 12 and first and second strength members 20.

Cable 10 may include an armor component 40. The armor component 40 may be embedded in the jacket 30 and comprise a suitable material to prevent rodent access and damage to the buffer tube 12 and optical fibers 14. As shown in FIGS. 1 and 2, the armor component 40 may comprise a first armor member 42 and a second armor member 44 arranged in a diametrically opposed relationship to one another. Completely encasing the cable in a steel armor will greatly reduce the sensitivity of the cable. By providing gaps in the armor component 40, the acoustic sensitivity of the cable 10 is improved. Because the acoustic impedance of steel is high, moving the armor component 40 away from the core opens up more space for incident wave power to propagate to the fibers 14. FIG. 1 illustrates the cable 10 with the armor component 40 displaced more away from the optical transmission component 12 and strength members 20 than the armor component 40 in FIG. 2. As shown in FIG. 1, the gap between each of the first armor member 42 and the second armor member 44 and the optical transmission component 12 is at least equal to or greater than the thickness of the armor members. As shown in FIG. 2, closing that gap will decrease the acoustic sensitivity of the cable but increase the rodent resistance of the cable. Although described as a gap above, the term gap should not be construed to indicate a lack of material between components but rather that the components are separated by a specific distance that is greater than 0 millimeters.

The armor component 40 may comprise a hardened stainless steel, for example, or any other suitable material that is harder than the teeth of the rodents in the installation territory. In addition, the armor component 40, or each armor member thereof, should be of sufficient thickness and width to sufficiently cover and protect the transmission component. For example, as shown in FIG. 1, the first armor member 42 and the second armor member may each comprise a stainless-steel strip embedded in the jacket 30, wherein each stainless-steel strip has a thickness greater than 0.17 millimeters. Stainless steel provides rodent protection as well as strength and corrosion resistance for outdoor applications. The thickness of the armor component 40 must be chosen to provide the desired protection while maintaining a certain degree of flexibility in the cable. In addition, by providing a two-piece armor configuration as shown in FIG. 1, the desired protection may be achieved while maintaining an acceptable bend performance of the cable 10.

As shown in FIG. 1, the optical transmission component 12 and optical fibers 14 are essentially surrounded by the first armor member 42, the second armor member 44, and the strength members 20. The material hardness and configuration of these components, such as the thickness, is selected to provide a protective shield around the optical transmission component 12 and the optical fibers 14 while maintaining the sensitivity and flexibility of the cable 10. In addition, the armor component 40 may be suitably bonded with cable jacket 30. Adhesion promoters, for example, or other suitable bonding methods, may be used to promote bonding with the cable jacket 30.

Figure 3:
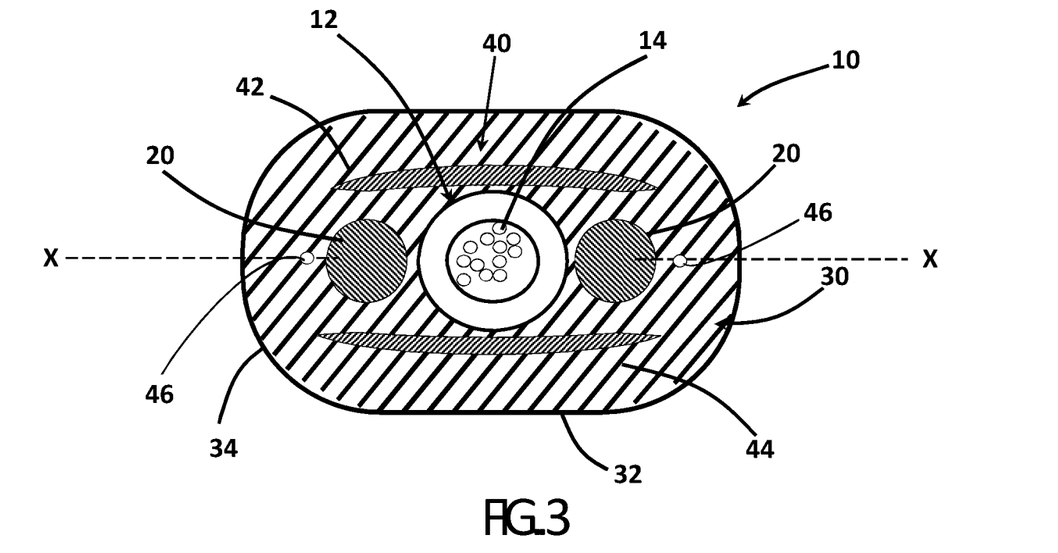
FIG. 3 is a cross-sectional view of a section of the first optical fiber cable with additional sensing fibers embedded in the jacket, in accordance with aspects of the present disclosure.

In accordance with yet other aspects of the present disclosure, and as shown in FIG. 3, in additional to the optical fibers 14 provided in the central buffer tube 12, sensing fibers 46 may be embedded directly into the jacket. As shown in FIG. 3, embedding the sensing fibers 46 outside of the protective armor component 40 and strength members 20, may improve the sensitivity of the cable. By placing the fibers relatively close to the strength members and along the preferential bend axis X-X, the sensing fibers 46 may also be sufficiently protected from rodent damage.

Although disclosed above as comprising a buffer tube 12, the cable 10 may comprise other optical loose tube components such as water-swellable tapes. In accordance with other aspects of the disclosure, the cable 10 may have no buffer tube 12. The jacket 30 may define a central cavity through which the optical fibers 14 are routed. The cavity may be round, ovular, or rectangular in shape, for example. The optical fibers 14 may be loose in the tube 12 or cavity, and or the optical fibers may be intermittently or continuously connected with a UV curable matrix, for example, to be rollable or standard optical fiber ribbons. Additionally, although a preferred embodiment of the armor component 40 is shown, other configurations of armor, for example, a plurality of metal strips above and below the cable core is contemplated. The armor component 40 may be comprised of any suitable material, including steel wires and/or glass impregnated aramid fibers, for example.

Figure 4:
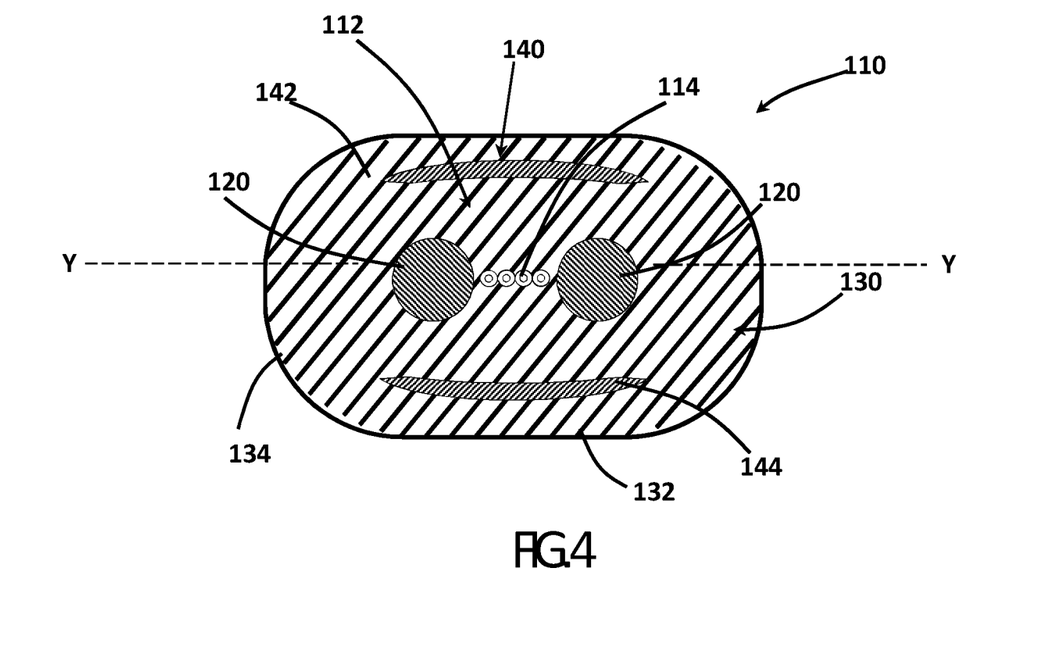
FIG. 4 is a cross-sectional view of a section of another optical fiber cable, in accordance with aspects of the present disclosure.
Figure 5:
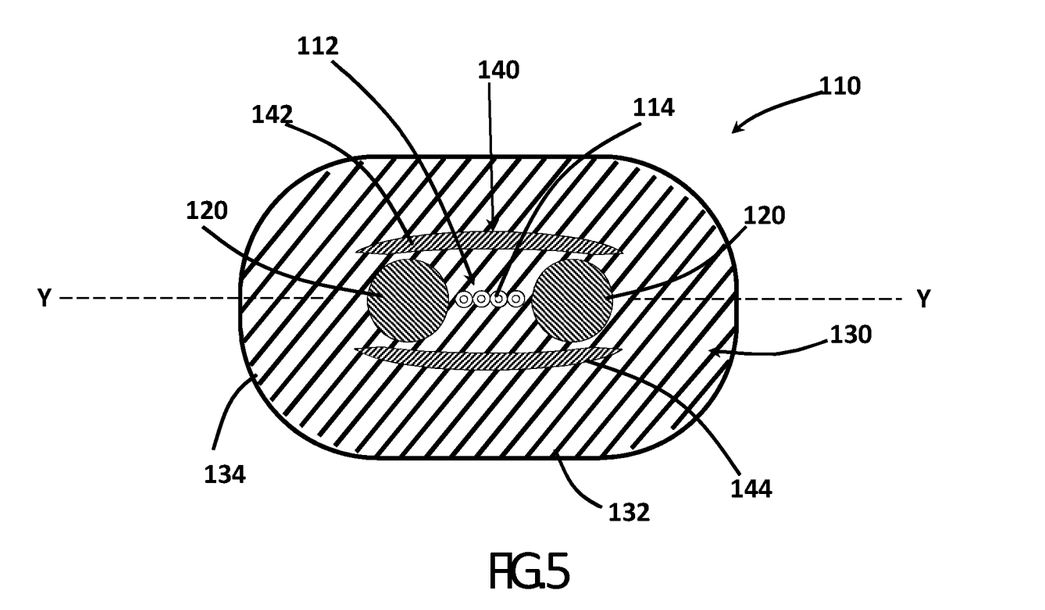
FIG. 5 is a cross-sectional view of a section of another optical fiber cable with the armor component moved closer to the preferential bend axis of the cable, in accordance with aspects of the present disclosure.

FIGS. 4 and 5 illustrate a fiber optic cable 110 comprising at least one optical transmission component, for example, an optical component 112 comprising at least one, but preferably a plurality of, optical fibers 114 in a central cavity or embedded directly into the jacket 130. The optical fibers are preferably silica-based, single mode fibers, but they can be any type of optical fiber including, for example, a multi-mode or dispersion shifted optical fibers. The optical fibers 114 may be intermittently or continuously connected with a UV curable matrix, for example, to be rollable or standard optical fiber ribbons. At least one of the optical fibers 114 is arranged to provide a sensing function.

As shown in FIGS. 4 and 5, the optical component 112 may be disposed between at least two strength components 120. Preferably, the strength components 120 are solid, rod-like members. By way of example, strength members 120 may be dielectric members such as glass-reinforced plastic (GRPs) having an oval, rectangular, or other shape and/or may be formed from steel or another suitable hard metal. If strength members 120 are formed from steel, then the fiber optic cable is no longer a dielectric design, but the cable may be able to be wrapped around structures for tie-down since the steel or metal strength members have a shape memory. In accordance with certain aspects of the present disclosure, the strength members 120 may be suitably bonded with cable jacket 130. To promote bonding with cable jacket 130, strength members 120 may include one or more adhesion promoters thereon such as selected from the ethylene-acrylic family such as an ethylene-acrylic acid (EAA), but other suitable bonding materials or mechanisms may be used. For instance, bonding can be mechanical bonding by using a strength component with a rough surface or the like.

Cable jacket 130 may be formed of a thermoplastic, e.g., PVC or MDPE. As shown in FIGS. 4 and 5, fiber optic cable 110 is generally of a flat configuration. Jacket 130 of fiber optic cable 110 comprises generally arcuate sections 134 and generally flat-sided sections 132. The strength components 120 are located generally adjacent to the optical component 112 with the respective centers of strength components 120 and optical component 112 being generally aligned in a preferential bend axis Y-Y. The figures show a cross-sectional view of a fiber optic cable 110 having an optical component 112 comprising a plurality of optical fibers 114, a first and a second strength component 120, and a cable jacket 130. As depicted, cable jacket 130 contacts the optical component 112 and first and second strength members 120.

Cable 110 may include an armor component 140. The armor component 140 may be embedded in the jacket 130 and comprise a suitable material to prevent rodent access and damage to the optical component 112 and optical fibers 114. As shown in FIGS. 4 and 5, the armor component 140 may comprise a first armor member 142 and a second armor member 144 arranged in a diametrically opposed relationship to one another. Completely encasing the cable in a steel armor will greatly reduce the sensitivity of the cable. By providing gaps in the armor component 140, the acoustic sensitivity of the cable 110 is improved. Because the acoustic impedance of steel is high, moving the armor component 140 away from the core opens up more space for incident wave power to propagate to the fibers 114. FIG. 4 illustrates the cable 110 with the armor component 140 displaced more away from the optical transmission component 112 and strength members 120 than the displacement of the armor component 140 in FIG. 2. As shown in FIG. 4, the gap between each of the first armor member 142 and the second armor member 144 and the strength members 120 is at least equal to or greater than the thickness of the armor members. As shown in FIG. 5, closing that gap will decrease the acoustic sensitivity of the cable but increase the rodent resistance of the cable. For example, as shown in FIG. 5, the gap between the armor component 140, comprising for example the first armor member 142 and the second armor member 144, may be less than the width of the armor component.

The armor component 140 may comprise a hardened stainless steel, for example, or any other suitable material that is harder than the teeth of the rodents in the installation territory. In addition, the armor component 140, or each armor member thereof, should be of sufficient thickness and width to sufficiently cover and protect the transmission component. For example, as shown in FIG. 4, the first armor member 142 and the second armor member may each comprise a stainless-steel strip embedded in the jacket 130, wherein each stainless steel strip has a thickness greater than 0.17 millimeters. Stainless steel provides rodent protection as well as strength and corrosion resistance for outdoor applications. The thickness of the armor component 140 must be chosen to provide the desired protection while maintaining a certain degree of flexibility in the cable. In addition, by providing a two-piece armor configuration as shown in FIG. 4, the desired protection may be achieved while maintaining an acceptable bend performance of the cable 110.

As shown in FIG. 5, the optical component 112 is essentially surrounded by the first armor member 142, the second armor member 144, and the strength members 120. The material hardness and configuration of these components, such as the thickness, is selected to provide a protective shield around the optical component 112 and the optical fibers 114 while maintaining the sensitivity and flexibility of the cable 110. In addition, the armor component 140 may be suitably bonded with cable jacket 130. Adhesion promoters, for example, or other suitable bonding methods, may be used to promote bonding with the cable jacket 130.

Figure 6:
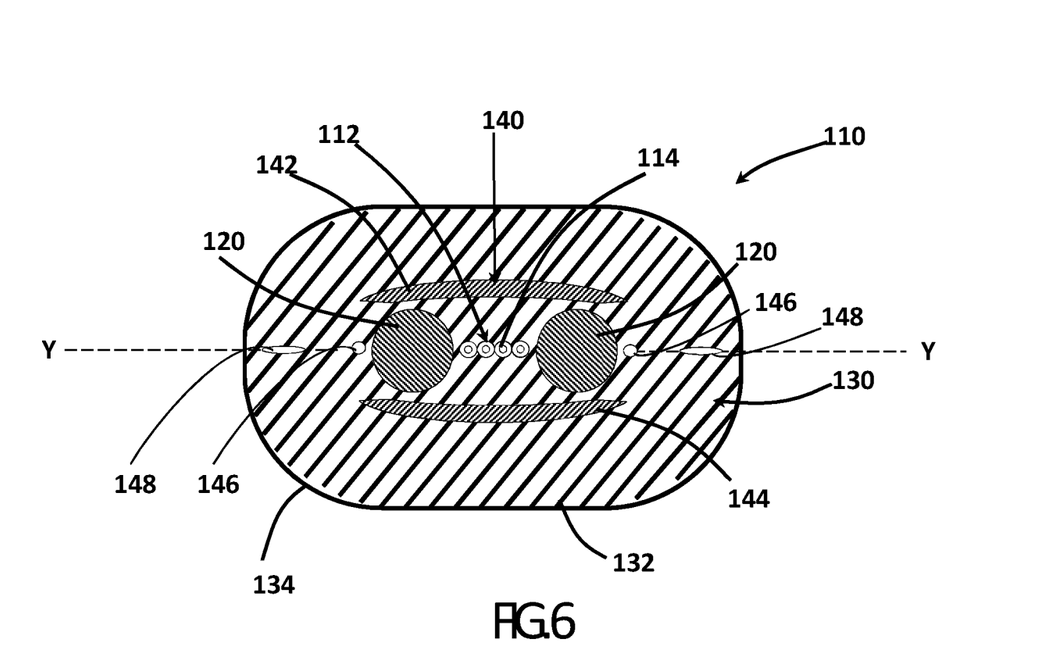
FIG. 6 is a cross-sectional view of a section of another optical fiber cable with additional sensing fibers embedded in the jacket, in accordance with aspects of the present disclosure.

In accordance with yet other aspects of the present disclosure, and as shown in FIG. 6, in additional to the optical fibers 114 provided in a central optical component 112, sensing fibers 146 may be embedded directly into the jacket outside of the protective structure of the strength members 120 and armor component 140. As shown in FIG. 6, embedding the sensing fibers 146 outside of the protective armor component 140 and strength members 120 may improve the sensitivity of the cable. By placing the fibers relatively close to the strength members and along the preferential bend axis X-X, the sensing fibers 146 still be sufficiently protected from rodent damage while providing enhanced sensing capabilities.

Both cable 10 and cable 110 may include jacket features to promote easy access to the cable core and/or cable components such as sensing fibers. For example, as shown in FIG. 6, the cable jacket 130 may include one or more embedded elongate members, shown as access features 148. In general, access features 148 are elongate members or structures embedded within the material of cable jacket 130. In various embodiments, access features 148 are contiguous members that extend the length of cable jacket 130 between the first and second ends of the cable.

In general, cable jacket 130 is made from a first material, and access features 148 are made from a second material that is different from the first material. The difference in materials provides a discontinuity or weakness within cable jacket 130 at the location of access features 148. These discontinuities provide an access point that allows a user of cable 110 to split cable jacket 130 when access to optical fibers 114 or 146 may be desired. In various embodiments, access features 148 may be formed from a material (e.g., a polypropylene/polyethylene blend) with low bonding relative to the material of cable jacket 130 (e.g., a medium density polyethylene) that allows for jacket splitting by the user. In various embodiments, access features 148 may be formed (e.g., coextruded) as described below. In other embodiments, access features 148 are non-extruded elements, such as rip cords, that are embedded in the material of cable jacket 130.

In the exemplary embodiment, the access features 148 are bonded to the main portion of the jacket when the jacket 130 is extruded. The main portion and the access features 148 can be formed from extrudable polymers, so that as the extrudate used to form the main portion of the jacket 130 and the access features 148 cools and solidifies, the extrudates become bonded at an interface of the access features 148. When the access features 148 are formed while extruding in the same step as the main portion of the jacket 130, the bond between access features 148 and the remainder of the jacket 130 can be generally described as enabled by polymer chain entanglement as the jacket 130 solidifies. The jacket 130 accordingly comprises a cohesive composite structure. The interfaces may be a transition region between the materials of the main portion of the jacket 12 and the access features 148.

The access features 148 can be relatively narrow strips in the jacket 130, and may occupy relatively small portions of the jacket cross-sectional area. In FIG. 6, two access features 148 are formed in the jacket 130 to facilitate opening of the jacket. However, the number, spacing, shape, composition and other aspects of the access features 148 can be varied.

In accordance with aspects of the disclosure, the main portion of the jacket 130 may be extruded from medium density polyethylene (MDPE), and the access features 148 may be extruded from polypropylene (PP). The jacket 130 may be formed in a coextrusion process so that the main portion of the jacket 130 and the access features 148 bond during cooling to form relatively strong bonds at the interfaces.

The cables disclosed herein may comprise fire resistant materials and qualify for a particular burn rating such as UL 94 VW1, riser, plenum, or LSZH.

The optical fibers discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

Figure 7:
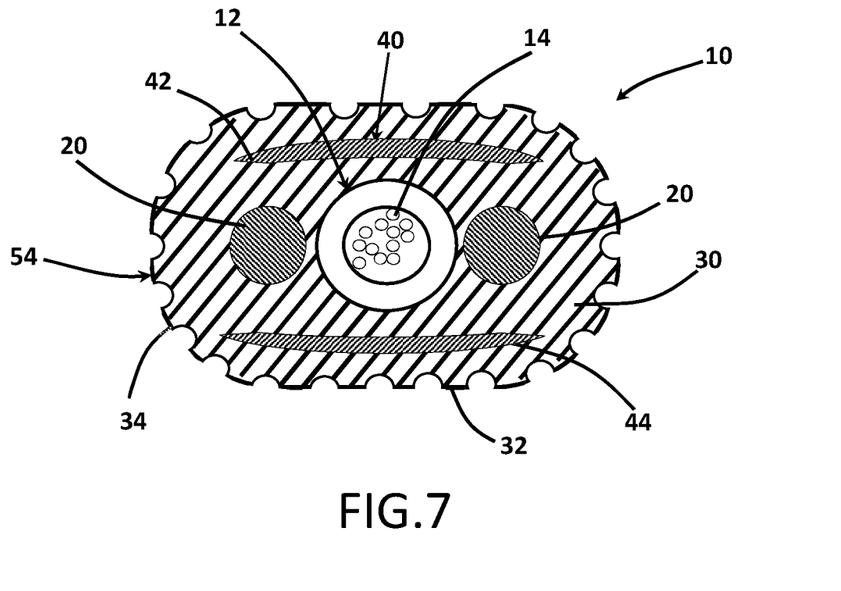
FIG. 7 is a cross-sectional view of a section of another optical fiber cable with a cable jacket having a contoured pattern including ridges and valleys, in accordance with aspects of the present disclosure.

In accordance with yet other aspects of the present disclosure, vibration sensing cables may include a cable jacket defining an outer surface having specific contoured patterns formed or provided on the outer surfaces of the cable to create an interference fit with the ground environment when the cable is installed into the ground environment. For example, as shown in FIG. 7, the contoured pattern may include a pattern of ridges and valleys 54 mechanically formed into the outer jacket 30 wherein aspects of the ground environment may fill in or, for example, in the case of concrete or asphalt, flow into the contoured pattern to create increased friction when the ground environment settles or the concrete or asphalt cures. The increased friction in combination with aspects of a pliable polyethylene jacket and the strength of the strain sensing cables disclosed herein can assist in the survivability rate of cables when cracks occur in the ground environment, such as in a concrete bridge section or roadway. In many cases, the displacement that results from crack formation occurs instantaneously. The contoured patterns may enable the cable jacket to provide a degree of yield and absorb the infinite forces created by instantaneous displacement from zero to crack width so that the optical fibers and cable survive.

It is to be understood that the foregoing description is exemplary only and is intended to provide an overview for the understanding of the nature and character of the fibers which are defined by the claims. For example, although disclosed as providing benefits against damage from rodents, such as squirrels, it is contemplated that the embodiments disclosed provide protection against other intrusive and damaging activity, such as that caused by insects and other animals.

The accompanying drawings are included to provide a further understanding of the embodiments and are incorporated and constitute part of this specification. The drawings illustrate various features and embodiments which, together with their description, serve to explain the principals and operation. It will become apparent to those skilled in the art that various modifications to the embodiments as described herein can be made without departing from the spirit or scope of the appended claims.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A sensing cable comprising:
a cable jacket;
an optical component embedded in the cable jacket;
a plurality of armor components embedded in the cable jacket;
a sensing fiber embedded in the cable jacket;
a first strength member embedded in the cable jacket; and
a second strength member embedded in the cable jacket, wherein each component of the plurality of armor components, the first strength member, and the second strength member surround the optical component with a gap formed between each component of the plurality of armor components, the optical component, the first strength member, and the second strength member;
wherein the plurality of armor components comprises a first armor member and a second armor member that are diametrically opposed to one another when viewed from a preferential bend plane of the cable;
wherein the optical component is a plurality of optical fibers or a buffer tube comprising a plurality of optical fibers; and
wherein the sensing fiber, the first strength member, the second strength member, and optical component are arranged on the preferential bend plane such that the optical component is positioned between the first strength member and the second strength member and the first strength member is positioned between the sensing fiber and the optical component.

2. The sensing cable of claim 1, wherein the first strength member and the second strength member are a GRP or steel rod.

3. The sensing cable of claim 1, wherein the armor component comprises a stainless-steel strip embedded in the cable jacket.

4. The sensing cable of claim 3, wherein the armor component has a thickness greater than 0.17 millimeters.

5. The sensing cable of claim 1, wherein the cable jacket comprises at least one access feature embedded within the cable jacket to provide access to the optical component by separation of the cable jacket along the at least one access feature.

6. The sensing cable of claim 5, wherein the cable jacket is made from a first material and the at least one access feature is made from a second material that is different from the first material to provide a discontinuity or weakness within the cable jacket at a location of the at least one access feature.

7. The sensing cable of claim 1, further comprising an adhesion promoter applied to strengthen a bond between the at least one strength member and the cable jacket.

8. The sensing cable of claim 1, wherein the cable jacket comprises a material having an acoustic impedance less than 2 MRayl.

9. The sensing cable of claim 1, wherein the cable jacket comprises a pattern of ridges and valleys mechanically formed into an outer surface of the cable jacket.

10. The sensing cable of claim 1, wherein the cable jacket has a flat configuration including two flat-sided sections between two arcuate sections.

11. The sensing cable of claim 1, wherein the gap between the first armor member and the second armor member is greater than or equal to the thickness of each armor member and wherein the gap between the first armor member and the second armor member is less than the width of each armor member.

12. The sensing cable of claim 1, further comprising a second sensing fiber embedded in the cable jacket, wherein the second sensing fiber is arranged on the preferential bend plane such that the second strength member is positioned between the second sensing fiber and the optical component.

13. The sensing cable of claim 5, wherein the at least one access feature comprises a first access feature embedded within the cable jacket and arranged on the preferential bend plane such that the sensing fiber is positioned between the first access feature and the first strength member.

14. The sensing cable of claim 1, further comprising a second sensing fiber, a first access feature, and a second access feature embedded within the cable jacket, wherein the first access feature and the second access feature each provide access to the optical component by separation of the cable jacket along each of the first access feature and the second access feature and wherein the second sensing fiber, the first access feature, and the second access feature are arranged on the preferential bend plane such that the sensing fiber is positioned between the first access feature and the first strength member, the second strength member is positioned between the second sensing fiber and the optical component, and the second sensing fiber is positioned between the second access feature and the second strength member.

15. A method of manufacturing a sensing cable, the method comprising:
   extruding a cable jacket to surround an optical component, a plurality of armor components, a sensing fiber, a first strength member, and a second strength member such that the optical component, the plurality of armor components, the sensing fiber, the first strength member, and the second strength member are embedded in the cable jacket, wherein each component of the plurality of armor components, the first strength member, and the second strength member surround the optical component with a gap formed between each component of the plurality of armor components, the sensing fiber, the first strength member, the second strength member, and the optical component;
   wherein the plurality of armor components comprises a first armor member and a second armor member that are diametrically opposed to one another when viewed from a preferential bend plane of the cable;
   wherein the optical component is a plurality of optical fibers or a buffer tube comprising a plurality of optical fibers; and
   wherein the sensing fiber, the first strength member, the second strength member, and optical component are arranged on the preferential bend plane such that the optical component is positioned between the first strength member and the second strength member and the first strength member is positioned between the sensing fiber and the optical component.

16. The method of claim 15, wherein the armor component comprises a stainless-steel strip embedded in the cable jacket.

17. The method of claim 16, wherein the armor component has a thickness greater than 0.17 millimeters.

18. The method of claim 15, further comprising:
   embedding at least one access feature within the cable jacket to provide access to the optical component by separation of the cable jacket along the at least one access feature.

19. The method of claim 15, further comprising the step of forming a pattern of ridges and valleys into an outer surface of the cable jacket.

20. The method of claim 15, wherein the cable jacket comprises a material having an acoustic impedance less than 2 MRayl.

21. The method of claim 15, wherein extruding further comprises extruding the cable jacket to also surround a second sensing fiber such that the second sensing fiber is embedded in the cable jacket, wherein the second sensing fiber is arranged on the preferential bend plane such that the second strength member is positioned between the second sensing fiber and the optical component.

22. The method of claim 18, wherein the at least one access feature comprises a first access feature embedded within the cable jacket and arranged on the preferential bend plane such that the sensing fiber is positioned between the first access feature and the first strength member.

23. The method of claim 15, wherein extruding further comprises extruding the cable jacket to also surround a second sensing fiber, a first access feature, and a second access feature such that the second sensing fiber, the first access feature, and the second access feature are embedded within the cable jacket, wherein the first access feature and the second access feature each provide access to the optical component by separation of the cable jacket along each of the first access feature and the second access feature and wherein the second sensing fiber, the first access feature, and the second access feature are arranged on the preferential bend plane such that the sensing fiber is positioned between the first access feature and the first strength member, the second strength member is positioned between the second sensing fiber and the optical component, and the second sensing fiber is positioned between the second access feature and the second strength member.

\* \* \* \* \*